United States Patent
Lee et al.

(10) Patent No.: US 6,615,053 B1
(45) Date of Patent: Sep. 2, 2003

(54) METHOD FOR CONTROLLING POWER FOR FORWARD COMMON CHANNEL

(75) Inventors: Young Jo Lee, Kyonggi-do (KR); Ki Jun Kim, Seoul (KR); Jong Sun Han, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 478 days.

(21) Appl. No.: 09/671,208

(22) Filed: Sep. 28, 2000

(30) Foreign Application Priority Data

Nov. 1, 1999 (KR) .......................... 1999-47995

(51) Int. Cl.[7] .............................................. H04B 7/05
(52) U.S. Cl. .............................. 455/522; 455/69
(58) Field of Search .............................. 455/68, 69, 70, 455/522; 370/318

(56) References Cited

U.S. PATENT DOCUMENTS

| | | | | |
|---|---|---|---|---|
| 4,811,421 A | * | 3/1989 | Havel et al. ................ | 455/69 |
| 5,461,639 A | * | 10/1995 | Wheatley et al. ............ | 370/342 |
| 5,603,096 A | * | 2/1997 | Gilhousen et al. ............ | 455/69 |
| 6,347,231 B1 | * | 2/2002 | Miya ......................... | 455/522 |
| 6,389,034 B1 | * | 5/2002 | Guo et al. ................... | 370/441 |
| 6,405,021 B1 | * | 6/2002 | Hamabe ...................... | 455/69 |
| 6,418,322 B1 | * | 7/2002 | Kim et al. ................... | 455/522 |
| 6,526,028 B1 | * | 2/2003 | Kondo ........................ | 370/333 |
| 2001/0011011 A1 | * | 8/2001 | Kosugi ........................ | 455/69 |
| 2002/0094836 A1 | * | 7/2002 | Nakamura et al. ........... | 455/522 |
| 2003/0002464 A1 | * | 1/2003 | Rezaiifar et al. ............. | 370/336 |
| 2003/0026219 A1 | * | 2/2003 | Moon et al. ................. | 370/318 |

* cited by examiner

Primary Examiner—Thanh Cong Le
Assistant Examiner—Tan Trinh

(57) ABSTRACT

A method for controlling power of a forward common channel is disclosed. The present method allows a base station to obtain an initial power value for a closed-loop power control of mobile stations when a base station transmits data to a plurality of mobile stations through an a forward common channel. Particularly, the present method permits a base station to determine an initial power according to either a variation of reception power transmitted from a mobile station or a variation of the PCBs transmitted from a mobile station.

13 Claims, 3 Drawing Sheets

METHOD FOR CONTROLLING POWER FOR FORWARD COMMON CHANNEL

BACKGROUND OF THE INVENTION

1. Field of the Invention

The present invention relates to a mobile communication system and more particularly, to a method of controlling power for a forward common channel.

2. Background of the Related Art

Generally, in W-CDMA mobile communication system, data is transmitted using orthogonal codes by synchronizing symbols of channels transmitted from a base station through forward links. As a result, the number of orthogonal codes used for distinguishing a plurality of mobile stations diminishes as the number of mobile stations and/or transmission rate increases. Thus, for a more efficient management of the limited number of orthogonal codes, a forward channel with one orthogonal code, namely a forward common data channel, is commonly assigned to a plurality of mobile stations and data is transferred to respective mobile stations based on time division.

FIG. 1 shows a forward common data channel (FCDCH) in the related art. A FCDCH is a channel that can be shared by a plurality of stations and a base station assigns an identical orthogonal code to respective mobile stations to form a FCDCH. The base stations distinguishes each of the plurality of mobile stations based upon time division and depending upon a transmission time of each such mobile stations, data which is not sensitive to delay is transmitted to respective mobile stations in frame units. FIG. 2 shows structures of a FCDCH in FIG. 1 and a Forward Common Data Control Channel (FCDCCH).

Referring to FIG. 2, a base station transmits a pilot symbol in every slot to estimate a channel state and a Signal Interference Ratio (SIR) of a forward link. The FCDCH also receives through a reverse link a Power Control Bit (PCB) in every slot from each of the mobile stations to perform a fast close loop power control. Accordingly, the FCDCH is transmitted in parallel with the FCDCCH which transmits the control information of the FCDCH and which performs a reverse link power control. Particularly, the FCDCCH broadcasts reverse link PCBs and control information of respective mobile stations to all used mobile stations in a cell. Here, the control information may be an FCDCH assignment message. Moreover, FCDCCH is transmitted at a fixed power without being fast close loop power controlled.

Furthermore, in a W-CDMA communication system, a Dedicated Physical Data Channel (DPDCH) is implemented for transmission of data in I channel signals of a dedicated reverse link channel; and a Dedicated Physical Control Channel (DPCCH) is implemented for transmission of pilot symbols, PCBs and control information of layer 1 in Q channel signals. A mobile station does not transmit the DPDCH if there are no data to be transmitted to a base station. On the other hand, mobile stations continue to transmit the pilot symbols and the PCBs through the DPCCH to maintain reverse link synchronization and forward link power control, even if there are no data to be transmitted to a base station.

However, if a base station in the related art transmits data to the plurality of mobile stations through a forward common channel, the close loop power control may not be maintained between the base station and a mobile station, causing a reduction of a user capacity and deterioration of the system performance. For example, if a base station transmits data to a mobile station through a forward common data channel by time synchronization of three frame, a power control of the mobile station for a first frame is not performed while a second and third frames are transmitted after the transmission of the first frame. Therefore, if data is to be transmitted to the mobile station in a fourth frame, a power control cannot be performed since the base station does not know an initial power value for restarting a transmission to the mobile station.

SUMMARY OF THE INVENTION

Accordingly, an object of the present invention is to solve at least the problems and disadvantages of the related art.

An object of the present invention is to provide an efficient method for controlling power of a forward common channel.

Another object of the present invention is to provide a method for controlling power of a forward common channel in which an initial power is obtained for use in transmission of data to a mobile station.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method for controlling power of a forward common channel set between a plurality of mobile stations and a base station in a communication system includes (1) measuring from a mobile station a first reception power of a FCDCCH at an end of data reception from the base station, (2) measuring from the base station a transmission power of a FCDCH at an end of data transmission to the mobile station, (3) receiving at the mobile station a channel assignment message from the base station, (4) measuring from the mobile station a second reception power of the FCDCCH when the channel assignment message is received, (5) calculating at the mobile station a difference of the first and second reception powers, and forwarding the difference to the base station, and (6) determining at the base station an initial power of the data transmitted to the mobile station using the transmitted difference and the measured transmission power of the FCDCH.

In another embodiment of the present invention, a method for controlling power of a forward common channel set between a plurality of mobile stations and a base station in a communication system includes (1) measuring from a mobile station a first reception power of an FCDCCH at an end of data reception from the base station, and setting the first reception power as a power control critical value, (2) measuring from the base station a transmission power of an FCDCH at an end of data transmission to the mobile station, (3) measuring from the mobile station second reception powers of the FCDCCH at fixed intervals, and transmitting PCBs to the base station according to a difference between the measured second reception power and the power control critical value, (4) accumulating at the base station and storing the PCBs transmitted from the mobile station, (5) receiving a channel assignment message at the mobile station, and (6) determining at the base station an initial power of the data to be transmitted to the mobile station using the accumulated PCBs and the transmission power of the FCDCH, upon reception of the channel assignment message at the mobile station.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Reference will now be made in detail to the preferred embodiments of the present invention, examples of which are illustrated in the accompanying drawings. Generally, the present method controls the power of an FCDCH, by which an initial power of a close loop power control is performed for each mobile station when data is transmitted between a base station and a plurality of mobile stations through a forward common channel. To accomplish such power control, two embodiments of the present invention will next be explained. For purposes of explanation, assume from hereon that data has been transmitted through a forward common channel between a mobile station and the base station.

Figure 1:
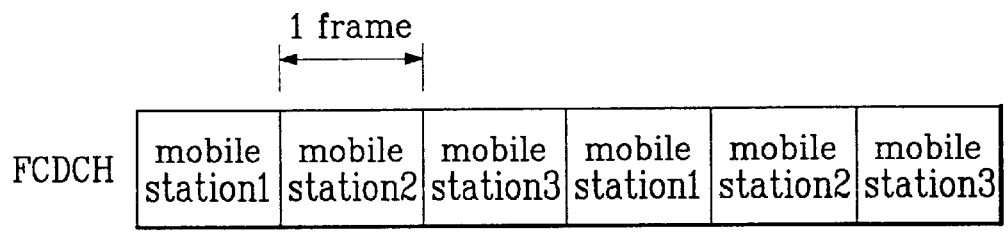
FIG. 1 shows a FCDCH in the related art.
Figure 2:
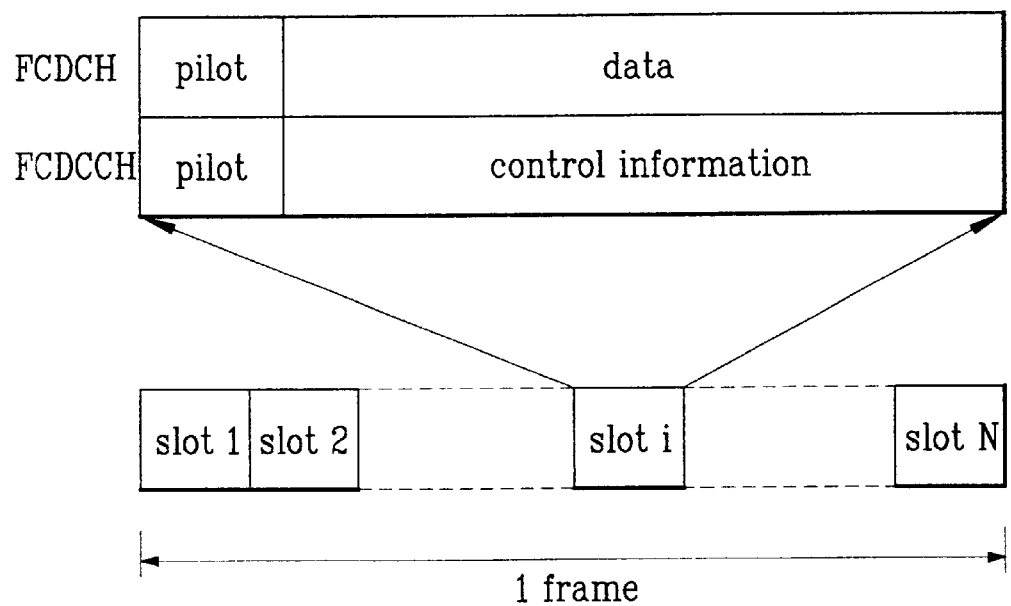
FIG. 2 shows structures of the FCDCH in FIG. 1 and an FCDCCH in the related art.
Figure 3:
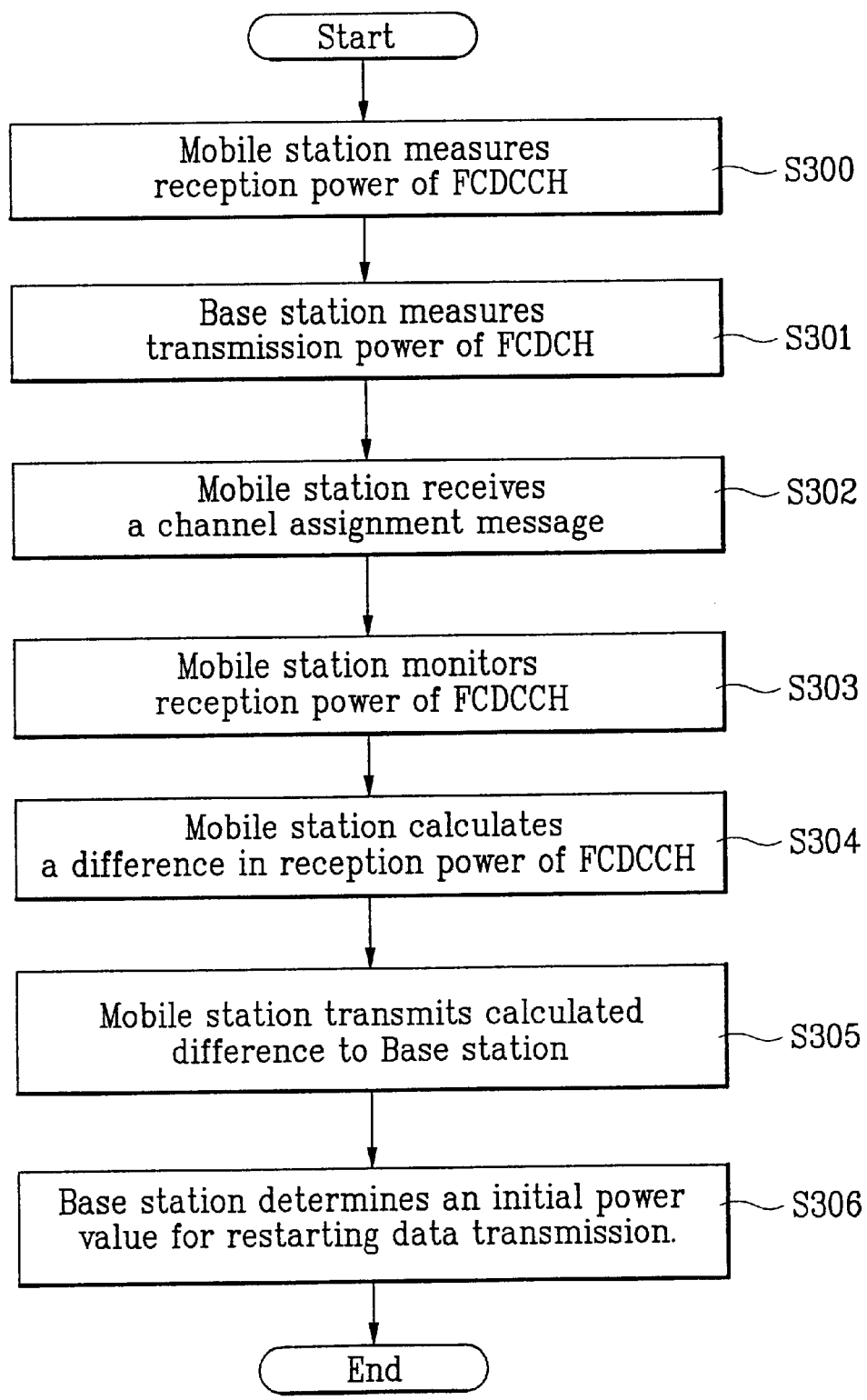
FIG. 3 is a flow chart of a method for controlling power of an FCDCH in accordance with a first embodiment of the present invention.

In the first embodiment of the method for controlling the power of a FCDCH, a mobile station monitors a reception power of a FCDCCH set in parallel with a FCDCH, and transmits a difference in the reception power to the base station. The base station then determines an initial power for close loop power control using the difference. FIG. 3 is a flow chart of a method for controlling power of a FCDCH in accordance with a first embodiment of the present invention.

Referring to FIG. 3, a mobile station monitors a FCDCCH to measure and store a reception power of the FCDCCH at the end of receiving a data frame transmitted to the mobile station through the FCDCH (S300). This reception power of the FCDCCH is defined as FCDCCH_END_POWER. Also, the base station measures and stores transmission power of the FCDCH at the end of transmitting a data frame to the mobile station through the FCDCH (S301). This transmission power is defined as FCDCH_END_POWER.

Upon receiving a FCDCH assignment message from the base station through the FCDCCH while monitoring the reception power of the FCDCCH (S302), the mobile station measures the reception power of the FCDCCH for restarting transmission of data before data is transmitted to the mobile station through the FCDCH. The reception power of the FCDCCH measured for restarting transmission of data is defined as FCDCCH_RESTART_POWER. The mobile station continues to monitor the reception power of the FCDCCH, even when there is no data frame being transmitted to the mobile station (S303).

Thereafter, the mobile station calculates a power difference $\Delta$ between the FCDCCH_END_POWER obtained in step S300 and the FCDCCH_RESTART_POWER (S304).

The mobile station then transmits the power difference $\Delta$ to the base station (S305). Accordingly, the base station uses the power difference $\Delta$ reported by the mobile station to determine an initial power for close loop power control of the mobile station according to equation 1 below (S306), where FCDCH_END_POWER is a transmission power of the FCDCH measured by the base station in step S301.

$$\text{Initial power} = \Delta + \text{FCCD\_END\_POWER} \quad [1]$$

Thus, the method for controlling power of a forward common channel in accordance with the first embodiment of the present invention permits a base station to determine an initial power for restarting transmission of data to a particular mobile station using a variation of reception power at the FCDCCH transmitted from the mobile station.

Figure 4:
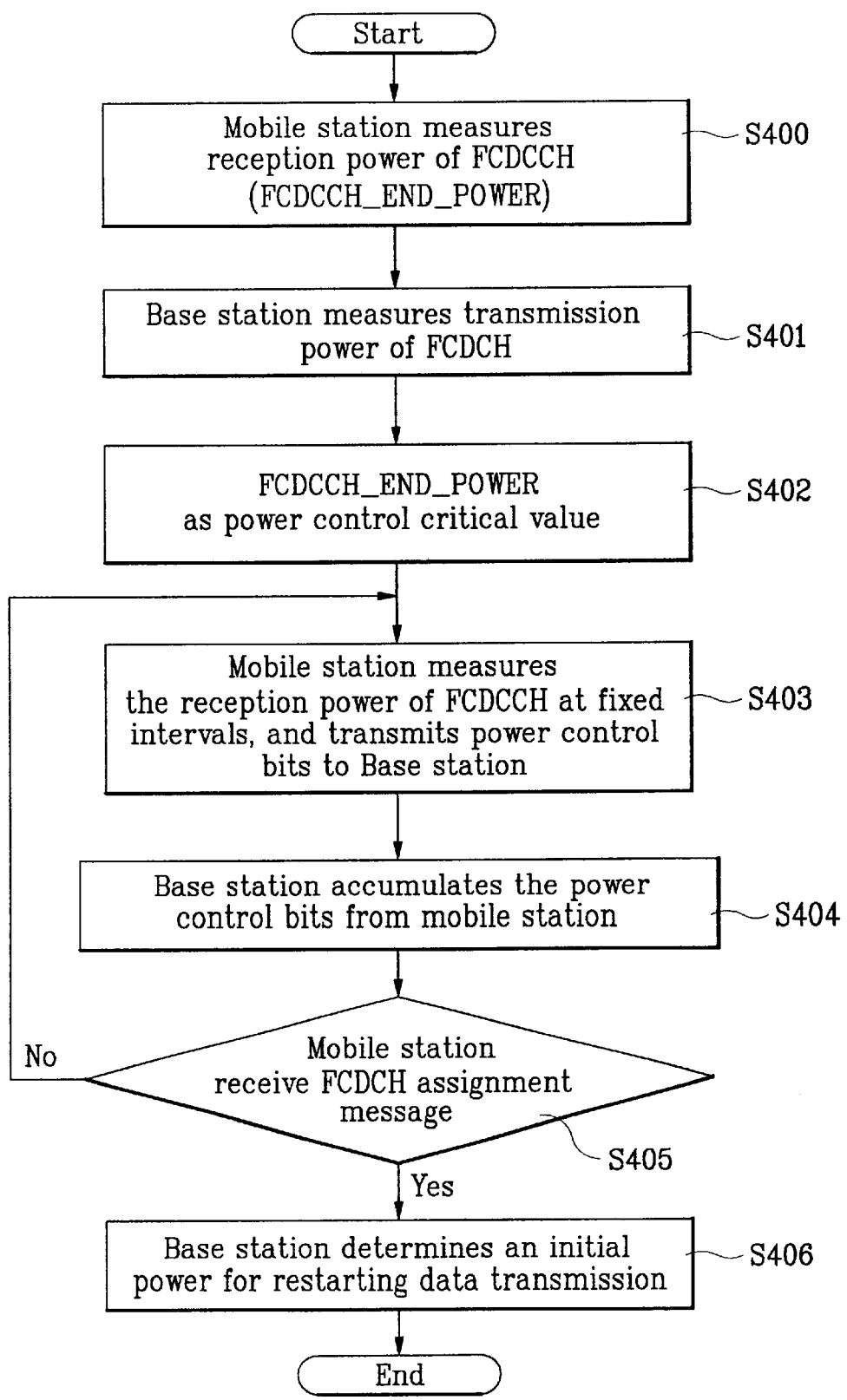
FIG. 4 is a flow chart of a method for controlling power of an FCDCH in accordance with a second embodiment of the present invention.

In the second embodiment of the method for controlling the power of a FCDCH, a base station accumulates PCBs or FCDCH transmitted from a mobile station and determines an initial power for close loop power control using the PCBs. FIG. 4 is a flow chart of a method for controlling power of an FCDCH in accordance with a second embodiment of the present invention.

Referring to FIG. 4, a mobile station monitors a FCDCCH to measure and store a reception power of the FCDCCH at the end of receiving a data frame transmitted to the mobile station through the FCDCH (S400). This reception power of the FCDCCH is defined as FCDCCH_END_POWER. The base station also measures and stores transmission power of the FCDCH at the end of transmitting a data frame to the mobile station through the FCDCH (S401). This transmission power is defined as FCDCH_END_POWER. The mobile station sets the FCDCCH_END_POWER as a power control critical value (S402).

Thereafter, the mobile station continues to monitor the reception power of the FCDCCH at every PCB transmission, even if data is not being transmitted to the mobile station through the FCDCH. The mobile station then transmits PCBs corresponding to the monitored reception power of the FCDCCH to the base station (S403). Particularly, before a PCB transmission, the mobile station measures the reception power of the FCDCCH and generates a PCB based upon a difference A between the power control critical value and the reception power of the FCDCCH measured before the PCB transmission. Thus, PCBs corresponding to the monitored reception power of the FCDCCH are transmitted to the base station. Here, the mobile station may generate PCBs based upon a difference $\Delta$ in any slot unit intervals, allowing PCBs based upon each respective difference $\Delta$ to be transmitted in one or more slots within a frame period before transmission of data is restarted to the mobile station. The slot interval for transmission of such PCBs depends on the application, but in the preferred embodiment, a PCB based upon a difference $\Delta$ is transmitted in every slot of a frame.

Accordingly, the base station accumulates and stores the PCBs from the mobile station (S404). The mobile station continues to transmit the PCBs corresponding to the monitored reception power of the FCDCCH and the base station continues to accumulate the transmitted PCBs until the mobile station receives a FCDCH assignment message from the base station through the FCDCCH (S405). When the mobile station receives the assignment message, the base station determines an initial power for restarting a data transmission to the mobile station if data is being transmitted to the mobile station again after transmitting an with data frame to a different mobile station (S406). Particularly, the base station determines the initial power by equation 2 below based upon the accumulated value of the PCBs transmitted from the mobile station.

$$\text{Initial Power} = a \underset{j=0}{\overset{i-1}{Q}} \text{jth\_PCB} + \text{FCDCH\_END\_POWER} \quad [2]$$

In equation 2, α denotes a power step size of a PCB and "i" denotes a number of accumulated PCBs before transmission of a data frame to the mobile station is again restarted. Thus, the method for controlling power of an FCDCH in accordance with a second embodiment of the present invention permits a base station to determine an initial power for restarting data transmission according to a variation of the PCBs transmitted from a particular mobile station.

By providing an initial power to be used in restarting a data transmission between a base station and a particular mobile station when data is being transmitted between the base station and a plurality of the mobile stations, the present method for controlling power of a forward common channel can increase a subscriber capacity and enhance the system performance by permitting the base station to conduct a close loop power control of the particular mobile station.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for controlling power of a forward common channel set between a plurality of mobile stations and a base station in a communication system comprising:
    (a) measuring, from a mobile station, a first reception power of an FCDCCH at an end of receiving a data transmitted from the base station;
    (b) measuring, from the base station, a transmission power of an FCDCH at an end of data transmission to said mobile station;
    (c) transmitting, from said mobile station, a power difference information based upon the first reception power; and
    (d) determining, from the base station, an initial power for restarting transmission of data to said mobile station using said power difference information and the transmission power.

2. A method of claim 1, wherein in (c), transmitting said power difference information when said mobile station receives a channel assignment message from the base station.

3. A method of claim 2, wherein measuring, from said mobile station, a second reception power of the FCDCCH upon receiving said channel assignment message, and wherein said power difference information is a difference between the first and second reception power.

4. A method of claim 1, wherein in (c), transmitting a power difference information in fixed intervals.

5. A method of claim 4, further comprising:
    setting, at said mobile station, the first reception power as a power critical value;
    measuring, from said mobile station, a second reception power of the FCDCCH in said fixed interval and generating a PCB based upon a difference of the first and second reception power to transmit PCBs in said fixed intervals as said power information.

6. A method of claim 5, further comprising accumulating, from the base station, PCBs transmitted in said fixed intervals; and wherein in (d), determining said initial power using said PCBs when said mobile station receives a channel assignment message from the base station.

7. A method of claim 4, wherein transmitting said power difference in any slot unit intervals.

8. A method for controlling power of a forward common channel set between a plurality of mobile stations and a base station in a communication system comprising:
    (a) measuring, from a mobile station, a first reception power of an FCDCCH at an end of receiving a data transmitted from the base station;
    (b) measuring, from the base station, a transmission power of an FCDCH at an end of data transmission to said mobile station;
    (c) transmitting, from said mobile station, a power difference information based upon the first reception power when said mobile station receives a channel assignment message transmitted from the base station; and
    (d) determining, from the base station, an initial power for restarting transmission of data to said mobile station using the power difference information and the transmission power.

9. A method of claim 8, wherein said power difference information is a difference between the first reception power and a second reception power of the FCDCCH measured when said mobile station receives said channel assignment message.

10. A method for controlling power of a forward common channel set between a plurality of mobile stations and a base station in a communication system comprising:
    (a) measuring, from a mobile station, a first reception power of an FCDCCH at an end of receiving a data transmitted from the base station;
    (b) measuring, from the base station, a transmission power of an FCDCH at an end of data transmission to said mobile station;
    (c) transmitting, from said mobile station, a power difference information based upon the first reception power in fixed intervals; and
    (d) determining, from the base station, an initial power for restarting transmission of data to said mobile station using the power difference information and the transmission power, when said mobile station receives a channel assignment message from the base station.

11. A method of claim 10, further comprising:
    setting, at said mobile station, the first reception power as a power critical value; and
    measuring, from said mobile station, a second reception power of the FCDCCH in said fixed interval and generating a PCB based upon a difference of the first and second reception power to transmit PCBs in said fixed intervals as said power information.

12. A method of claim 11, further comprising accumulating, from the base station, PCBs transmitted in said fixed intervals; and wherein in (d), determining said initial power using said PCBs when said mobile station receives a channel assignment message.

13. A method of claim 10, wherein transmitting said power difference in any slot unit intervals.

* * * * *